(12) United States Patent
Maezawa

(10) Patent No.: US 11,488,567 B2
(45) Date of Patent: Nov. 1, 2022

(54) INFORMATION PROCESSING METHOD AND APPARATUS FOR PROCESSING PERFORMANCE OF MUSICAL PIECE

(71) Applicant: YAMAHA CORPORATION, Hamamatsu (JP)

(72) Inventor: Akira Maezawa, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 194 days.

(21) Appl. No.: 17/005,924

(22) Filed: Aug. 28, 2020

(65) Prior Publication Data

US 2020/0394989 A1 Dec. 17, 2020

Related U.S. Application Data

(63) Continuation of application No. PCT/JP2019/006048, filed on Feb. 19, 2019.

(30) Foreign Application Priority Data

Mar. 1, 2018 (JP) .............................. JP2018-036650

(51) Int. Cl.
*G10H 1/00* (2006.01)
*G06N 20/00* (2019.01)
*G06N 3/08* (2006.01)

(52) U.S. Cl.
CPC ............. *G10H 1/0008* (2013.01); *G06N 3/08* (2013.01); *G06N 20/00* (2019.01);
(Continued)

(58) Field of Classification Search
CPC ........... G10H 1/0008; G10H 2210/051; G10H 2210/091; G10H 2250/311
(Continued)

(56) References Cited

U.S. PATENT DOCUMENTS 7,427,708 B2 * 9/2008 Ohmura ................... G10H 1/06
  84/622
8,831,762 B2 * 9/2014 Abe ......................... G10H 1/16
  84/623
(Continued)

FOREIGN PATENT DOCUMENTS

JP 2001290474 A * 10/2001
JP 2001290474 A   10/2001
(Continued)

OTHER PUBLICATIONS

International Search Report issued in Intl. Appln. No PCT/JP2019/006048 dated May 7, 2019. English translation provided.
(Continued)

*Primary Examiner* — Christina M Schreiber
(74) *Attorney, Agent, or Firm* — Rossi, Kimms & McDowell LLP

(57) ABSTRACT

Provided is an information processing apparatus that generates various kinds of time series data according to a performance tendency of a user. The information processing apparatus includes an index specifying unit 22 that specifies performance tendency information that indicates a performance tendency of a performance of a musical piece by a user by inputting observational performance data X representing the performance to a learned model La and an information processing unit 23 that generates time series data Z regarding the musical piece according to the performance tendency information.

18 Claims, 8 Drawing Sheets

(52) U.S. Cl.
CPC . *G10H 2210/051* (2013.01); *G10H 2210/091* (2013.01); *G10H 2250/311* (2013.01)

(58) Field of Classification Search
USPC .......................................................... 84/600
See application file for complete search history.

(56) References Cited

U.S. PATENT DOCUMENTS

| | | | | |
|---|---|---|---|---|
| 2004/0123726 | A1* | 7/2004 | Kato | G10H 1/0008 84/609 |
| 2011/0003638 | A1* | 1/2011 | Lee | G10H 1/368 463/43 |
| 2015/0287335 | A1* | 10/2015 | Lee | G10H 7/00 84/477 R |
| 2016/0104469 | A1* | 4/2016 | Takahashi | G09B 15/00 84/609 |
| 2019/0156809 | A1* | 5/2019 | Maezawa | G10H 1/40 |
| 2020/0160820 | A1* | 5/2020 | Maezawa | G06N 7/005 |
| 2020/0160821 | A1* | 5/2020 | Maezawa | G06N 3/088 |
| 2020/0193948 | A1* | 6/2020 | Maezawa | G10H 1/0033 |
| 2020/0365123 | A1* | 11/2020 | Maezawa | G06T 13/205 |
| 2020/0365126 | A1* | 11/2020 | Maezawa | G10H 1/368 |
| 2020/0394989 | A1* | 12/2020 | Maezawa | G10G 1/00 |
| 2021/0151014 | A1* | 5/2021 | Maezawa | G06N 3/0472 |
| 2021/0342490 | A1* | 11/2021 | Briancon | G06F 21/75 |
| 2022/0036866 | A1* | 2/2022 | Isozaki | G10G 1/00 |

FOREIGN PATENT DOCUMENTS

| | | | |
|---|---|---|---|
| JP | 2004272067 A | * | 9/2004 |
| JP | 2004272067 A | | 9/2004 |
| JP | 2015079183 A | | 4/2015 |
| WO | 2010095622 A1 | | 8/2010 |
| WO | WO-2010095622 A1 | * | 8/2010 ............... G10H 1/16 |

OTHER PUBLICATIONS

Written Opinion issued in Intl. Appln. No. PCT/JP2019/006048 dated May 7, 2019.

* cited by examiner

INFORMATION PROCESSING METHOD AND APPARATUS FOR PROCESSING PERFORMANCE OF MUSICAL PIECE

CROSS REFERENCE TO RELATED APPLICATIONS

The present application is a continuation application of International Application No. PCT/JP2019/006048, filed Feb. 19, 2019, which claims a priority to Japanese Patent Application No. 2018-036650, filed Mar. 1, 2018. The contents of these applications are incorporated herein by reference in their entirety.

BACKGROUND

Technological Field

The present disclosure relates to technology for processing data regarding a performance of a musical piece.

Background Information

WO 20101095622 discloses technology for changing the timbre of a given musical instrument included in played sound of a musical piece to the timbre of another musical instrument by processing an acoustic signal representing the played sound, for example. WO 2010/095622 also discloses technology for generating an acoustic signal to which a specific musical expression is added.

SUMMARY

A tendency (e.g., a musical expression or a playing habit) that is unique to a player is reflected in a performance of a musical piece. To make existing musical piece data (e.g., MIDI data) that represents content of a standard performance of a musical piece reflect a specific tendency regarding a performance, a task of manually editing the musical piece data needs to be performed by an operator such as a musical producer, and there is a problem in that the load of the task is excessively large. In consideration of the above circumstances, the present disclosure aims to generate various kinds of time series data according to a performance tendency of a user.

To solve the above-described problem, an information processing method according to a preferable aspect of the present disclosure includes generating performance tendency information indicating a performance tendency of a performance of a musical piece by a user from observational performance data representing the performance input to a learned model, and generating time series data of the musical piece according to the generated performance tendency information. An information processing method according to another preferable aspect of the present disclosure includes specifying, with respect to each of a plurality of mutually different performance tendencies, an index value that indicates a probability that a performance of a musical piece by a user corresponds to the performance tendency, by inputting observational performance data representing the performance to a learned model, and generating time series data that represents a time series of information regarding the musical piece from a plurality of sets of basic data according to the index values specified for the respective performance tendencies, the plurality of sets of basic data respectively representing time series of information corresponding to the plurality of performance tendencies.

An information processing apparatus according to a preferable aspect of the present disclosure includes a memory storing instructions, and a processor that implements the instructions to execute a plurality of tasks, including a first generating task that generates performance tendency information indicating a performance tendency of a performance of a musical piece by a user from observational performance data representing the performance input to a learned model, and a second generating task that generates time series data of the musical piece according to the generated performance tendency information. An information processing apparatus according to another preferable aspect of the present disclosure includes an index specifying unit that specifies, with respect to each of a plurality of mutually different performance tendencies, an index value that indicates a probability that a performance of a musical piece by a user corresponds to the performance tendency, by inputting observational performance data representing the performance to a learned model, and an information processing unit that generates time series data that represents a time series of information regarding the musical piece from a plurality of sets of basic data according to the index values specified for the respective performance tendencies, the plurality of sets of basic data respectively representing time series of information corresponding to the plurality of performance tendencies.

DETAILED DESCRIPTION OF THE EMBODIMENTS

First Embodiment

Figure 1:
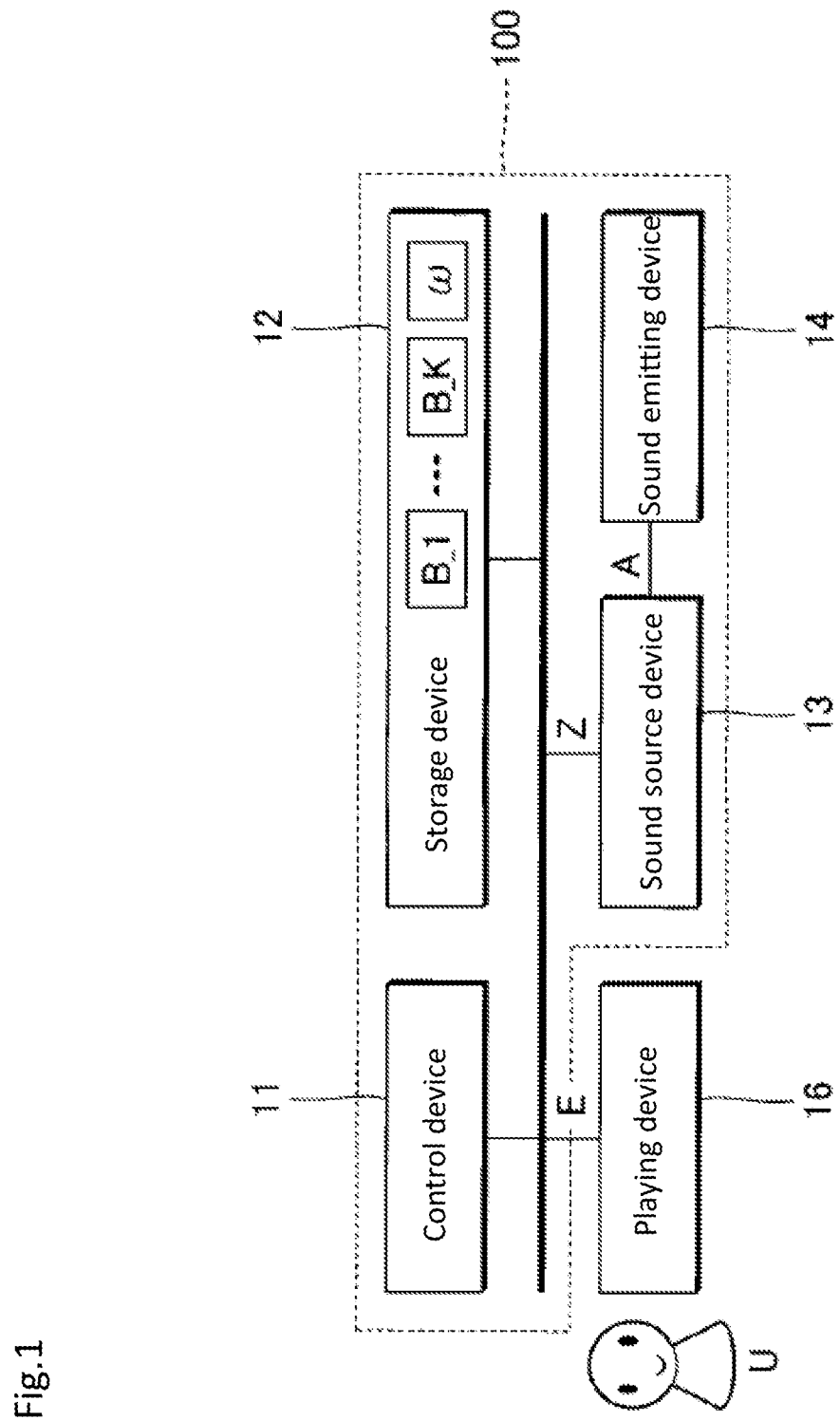
FIG. 1 is a block diagram showing an example of a configuration of an information processing apparatus according to a first embodiment.

FIG. 1 is a block diagram showing an example of a configuration of an information processing apparatus 100 according to a first embodiment. As shown in FIG. 1, the information processing apparatus 100 according to the first embodiment is a computer system that includes a control device 11, a storage device 12, a sound source device 13, and a sound emitting device 14. A portable information terminal, such as a mobile phone or a smartphone, or a portable or stationary information terminal, such as a personal computer, is preferably used as the information processing apparatus 100, for example.

A playing device 16 is connected to the information processing apparatus 100 according to the first embodiment.

The information processing apparatus 100 and the playing device 16 may be connected to each other either by wired connection or wireless connection. The playing device 16 is an input device that a user U uses to play a musical piece (hereinafter referred to as a "played musical piece"). A keyboard instrument type playing device (e.g., MIDI instrument) in which a plurality of keys to be operated by the user U are arranged is preferably used as the playing device 16, for example. Note that the playing device 16 and the information processing apparatus 100 may also be constituted as a single body.

The playing device 16 sequentially outputs instruction data E for each operation performed by the user U. The instruction data E is data MIDI event data) that is generated for each note of a plurality of notes played by the user U and specifies the pitch and the sound volume of the note and gives an instruction for emitting sound or muting sound. In the first embodiment, a case is assumed in which the user U plays a first playing part of a plurality of playing parts that constitute a played musical piece by using the playing device 16. The first playing part is a melody part of the played musical piece, for example.

A tendency (hereinafter referred to as a "performance tendency") that is unique to the user U is reflected in a performance given by the user U by using the playing device 16. The performance tendency is a feature that is added to the performance due to circumstances such as a musical intention or musical expression of the performer or a habit relating to a playing motion of the performer. Specifically, performance tendencies are classified according to tendencies of the sound length and the sound volume of each note. A plurality of performance tendencies are envisioned, such as a standard performance tendency (normal), a performance tendency (delicate) under which each note is played long and the sound volume is reduced, a performance tendency (dynamic) under which each note is played long and the sound volume is increased, and a performance tendency (melodious) under which each note is played short, for example.

The control device 11 (processor) is a processing circuit such as a CPU (Central Processing Unit), for example, and comprehensively controls elements of the information processing apparatus 100. The control device 11 implements the instructions to execute a plurality of tasks. The storage device 12 (memory) stores a program to be executed by the control device 11 and various kinds of data to be used by the control device 11. A program to be executed by the control device 11 includes instructions. The storage device 12 is constituted by a known recording medium, such as a magnetic recording medium or a semiconductor recording medium, or a combination of a plurality of kinds of recording mediums, for example. Note that a configuration is also possible in which a storage device 12 that is separate from the information processing apparatus 100 is prepared and the control device 11 performs writing into the storage device 12 and reading from the storage device 12 via a communication network. That is, the storage device 12 may also be omitted from the information processing apparatus 100.

The storage device 12 in the first embodiment stores a plurality of (K) sets of basic data $B\_1$ to $B\_K$ that correspond to mutually different performance tendencies (hereinafter referred to as "candidate tendencies"). Each set of basic data $B\_k$ ($k=1$ to K) is time series data that represents content of a played musical piece. Specifically, each set of basic data $B\_k$ specifies a time series of notes that constitute a second playing part of the played musical piece. The second playing part is a playing part of the played musical piece other than the first playing part played by the user U. A preferable example of the second playing part is one or more accompaniment parts of the played musical piece, for example. Specifically, each set of basic data $B\_k$ specifies the pitch, the sound volume, and a sound emission period with respect to each note of a plurality of notes that constitute the second playing part of the played musical piece. A preferable example of the basic data $B\_k$ is an MIDI file (SMF: Standard MIDI File) in which instruction data that specifies the pitch and the sound volume and gives an instruction for emitting sound or muting sound and time data that specifies a point in time for processing each instruction data are chronologically arranged.

Each set of basic data $B\_k$ corresponds to a k-th candidate tendency $C\_k$ of K kinds of candidate tendencies $C\_1$ to $C\_K$. Basic data $B\_k$ that corresponds to a given candidate tendency $C\_k$ specifies content of the second playing part of the played musical piece to be played under the candidate tendency $C\_k$. That is, the second playing part that is represented by the basic data $B\_k$ musically matches the first playing part that is played under a performance tendency that is approximate to the candidate tendency $C\_k$.

Figure 2:
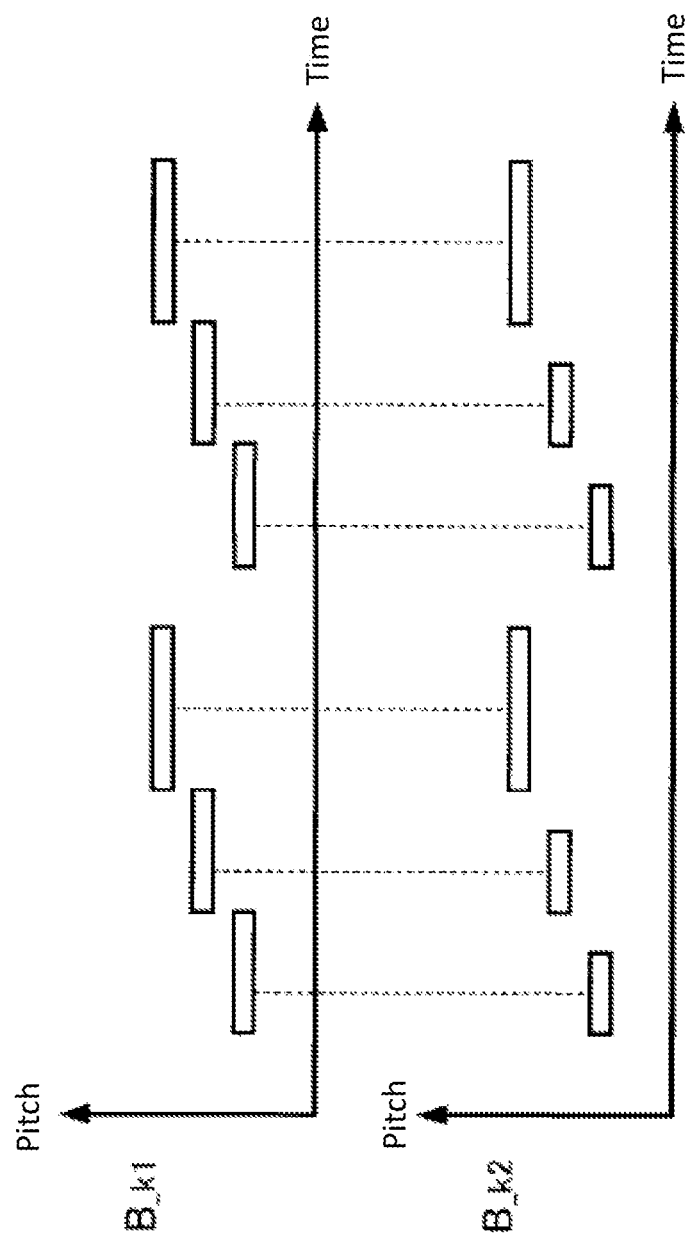
FIG. 2 is a diagram for explaining notes specified by basic data pieces.

FIG. 2 is a diagram for explaining notes specified by K basic data pieces $B\_1$ to $B\_K$. FIG. 2 shows two sets of basic data $B\_k1$ and $B\_k2$ ($k1$, $k2=1$ to K, $k1 \approx k2$) as an example for the sake of convenience. As shown in FIG. 2, notes correspond to each other in the K sets of basic data $B\_1$ to $B\_K$, but characteristic values (the sound length and the sound volume) of the notes differ in the K sets of basic data $B\_1$ to $B\_K$ due to a difference in the performance tendency. This can also be described as the arrangement being different for each of the K sets of basic data $B\_1$ to $B\_K$.

The control device 11 in the first embodiment generates time series data Z from the K sets of basic data $B\_1$ to $B\_K$ according to instruction data F sequentially supplied from the playing device 16. The time series data Z specifies a time series of notes that constitute the second playing part of the played musical piece. Specifically, similarly to each set of basic data $B\_k$, the time series data Z specifies the pitch, the sound volume, and the sound emission period with respect to each note of a plurality of notes constituting the second playing part of the played musical piece. The control device 11 in the first embodiment generates time series data Z that represents content of a performance of the second playing part in which a performance tendency of the user U is reflected.

The sound source device 13 shown in FIG. 1 generates an acoustic signal A according to the time series data Z generated by the control device 11. The acoustic signal A represents played sound of the second playing part specified by the time series data Z. An MIDI sound source is preferably used as the sound source device 13, for example. The sound emitting device 14 emits sound represented by the acoustic signal A generated by the sound source device 13. A speaker device or headphones are preferably used as the sound emitting device 14, for example. Note that illustration of a D/A converter that converts the acoustic signal A generated by the sound source device 13 from a digital signal to an analogue signal and an amplifier that amplifies the acoustic signal A is omitted for the sake of convenience. As can be understood from the above description, played sound of the second playing part in which a performance tendency of the first playing part played by the user U is reflected is emitted from the sound emitting device 14. Note that FIG. 1 shows a configuration in which the information processing apparatus 100 includes the sound source device 13 and the sound emitting device 14 as an example, but a configuration is also possible in which one or both of the sound source device 13 and the sound emitting device 14 are provided outside the information processing apparatus 100. For example, a configuration is also possible in which the sound source device 13 or the sound emitting device 14, which is separate from the information processing apparatus 100, is connected to the information processing apparatus 100 by wired connection or wireless connection.

Figure 3:
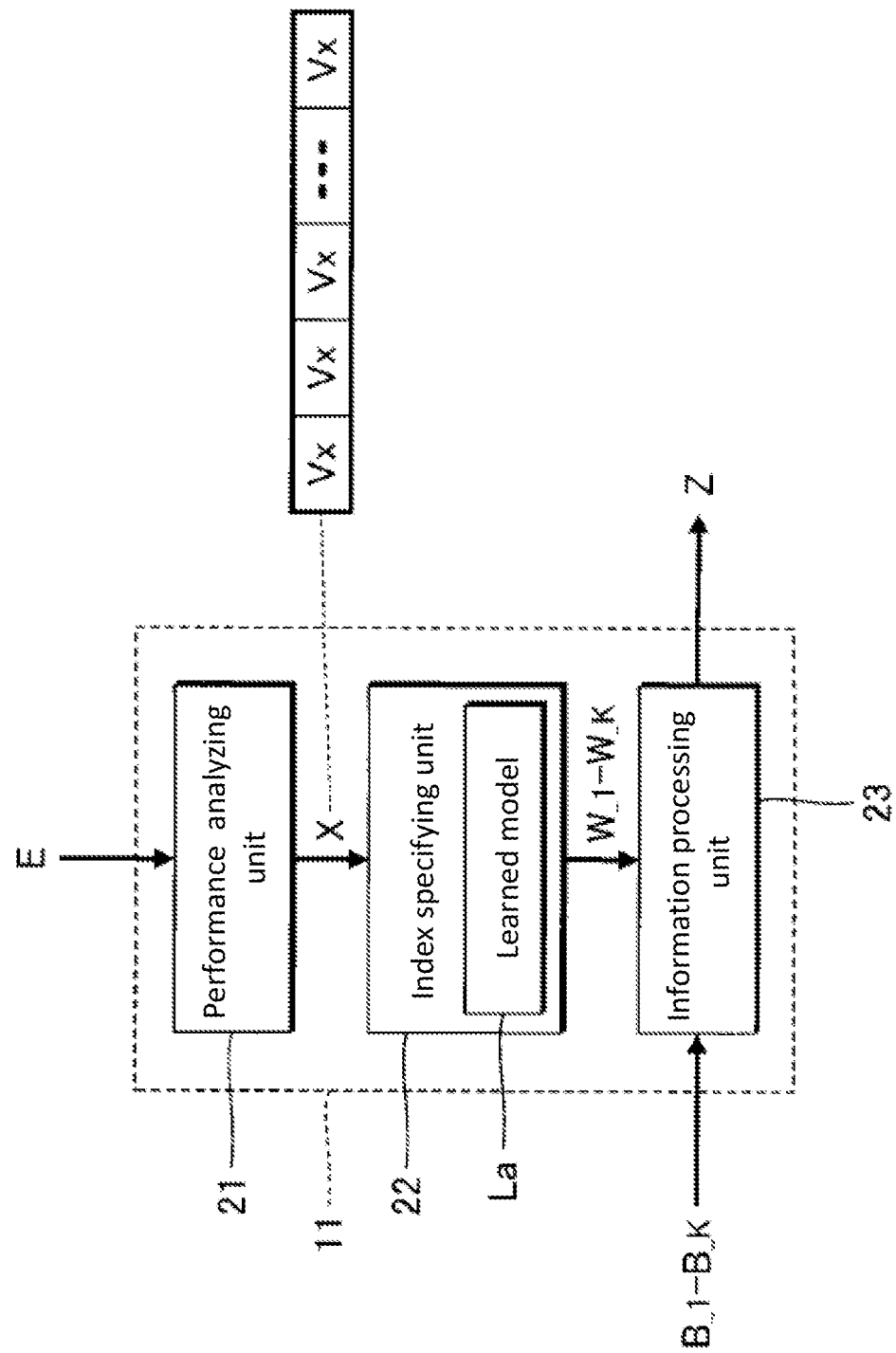
FIG. 3 is a block diagram showing an example of a functional configuration of a control device included in the information processing apparatus.

FIG. 3 is a block diagram showing an example of a functional configuration of the control device 11 included in the information processing apparatus 100. As shown in FIG. 3, the control device 11 realizes a plurality of functions (a performance analyzing unit 21, an index specifying unit 22, and an information processing unit 23) for generating time series data Z from a time series of instruction data F and the K sets of basic data B_1 to B_K by executing a program stored in the storage device 12. Note that the functions of the control device 11 may also be realized by a plurality of devices that are constituted separately from each other, or some or all of the functions of the control device 11 may also be realized by a dedicated electronic circuit.

The performance analyzing unit 21 generates observational performance data X from instruction data E that is sequentially output by the playing device 16. The observational performance data X represents a performance of a musical piece given by the user U. The performance analyzing unit 21 sequentially generates the observational performance data X for each unit period (frame) on a time axis. The unit period is set to a length of time that is sufficiently shorter than a single note of the played musical piece.

The observational performance data X in the first embodiment is an N-dimensional vector that indicates a played sound volume (velocity) with respect to each of a plurality of (N) pitches that can be played using the playing device 16. That is, out of N elements Vx of the vector indicated by the observational performance data X, an element Vx that corresponds to a pitch played by the user U is set to a numerical value that indicates the sound volume of the pitch played by the user U and elements Vx that correspond to pitches that are not played by the user U are set to a numerical value (e.g., 0) that means that the pitches are not played by the user U.

The index specifying unit 22 shown in FIG. 3 specifies K index values W_1 to W_K that correspond to mutually different candidate tendencies C_k by using the observational performance data X sequentially generated by the performance analyzing unit 21. An index value W_k that corresponds to a given candidate tendency C_k indicates a probability that the performance tendency of the user U corresponds to the candidate tendency C_k. Specifically, the closer the performance tendency of the user U is to the candidate tendency C_k, the larger the index value W_k is. Accordingly, the K index values W_1 to W_K can also be said to be information that represents the performance tendency of the user U. In the first embodiment, a probability that is normalized such that the sum of the K index values W_1 to W_K becomes 1 is described as an example of the index value W_k. A combination of the K index values W_1 to W_K serves as information that indicates proportions of the respective performance tendencies C_1 to C_K regarding the performance of the user U, and accordingly the combination of the index values W_1 to W_K is information (performance tendency information) that indicates a performance tendency of the performance of the user U. The index specifying unit 22 in the first embodiment specifies the K index values W_1 to W_K with respect to each period (hereinafter referred to as an "analysis period") having a predetermined length on the time axis. That is, the K index values W_1 to W_K are specified with respect to a given analysis period by using observational performance data X within the analysis period. The analysis period includes a plurality of unit periods. A period that corresponds to a bar of the played musical piece is a preferable example of the analysis period.

The index specifying unit 22 in the first embodiment specifies the K index values W_1 to W_K by inputting the observational performance data X representing a performance of the played musical piece given by the user U to a learned model La. The learned model La is a statistical prediction model obtained by learning a relationship between observational performance data X and K index values W_1 to W_K, and outputs K index values W_1 to W_K in response to input of observational performance data X. A neural network is preferably used as the learned model La. The learned model La is constituted by a plurality of long short term memory (LSTM) units that are connected to each other in series, for example. The long short term memory units are a specific example of a recurrent neural network (RNN) that is preferable for analysis of time series data. The learned model La outputs K index values W_1 to W_K for each unit period by using observational performance data X of each unit period. The index specifying unit 22 calculates K definite index values W_1 to W_K for an analysis period by using K index values W_1 to W_K that are calculated for each unit period within the analysis period. A representative value (e.g., an average value or the median value) of index values W_k of a plurality of unit periods within the analysis period is determined as the index value W_k of the analysis period, for example. Note that any method can be used to determine the index value W_k of an analysis period from index values W_k of a plurality of unit periods within the analysis period. The latest numerical value of the index values W_k of the plurality of unit periods within the analysis period (i.e., the index value W_k of the last unit period within the analysis period) may also be determined as the index value W_k of the analysis period, for example.

The learned model La is realized by a combination of a program (e.g., a program module that constitutes artificial intelligence software) that causes the control device 11 to execute computation for generating the K index values W_1 to W_K from the observational performance data X and a plurality of coefficients ω that are applied to the computation. The plurality of coefficients co are set through machine learning (in particular, deep learning) that is performed using a large number of sets of training data, and are stored in the storage device 12.

Each set of training data used for the machine learning is data in which observational performance data X of a unit period is associated with K index values W_1 to W_K (i.e., a pair composed of the observational performance data X of a unit period and the K index values W_1 to W_K). The plurality of coefficients w of the learned model La are set in the machine learning so as to minimize a loss function that represents a difference between K index values W_1 to W_K that are generated when observational performance data X that serves as training data is input to a provisional model and K index values W_1 to W_K (i.e., correct answer) of the training data. Therefore, the learned model La outputs K index values W_1 to W_K that are statistically appropriate for unknown observational performance data X under a tendency that is extracted from the large number of sets of training data used for the machine learning.

Figure 4:
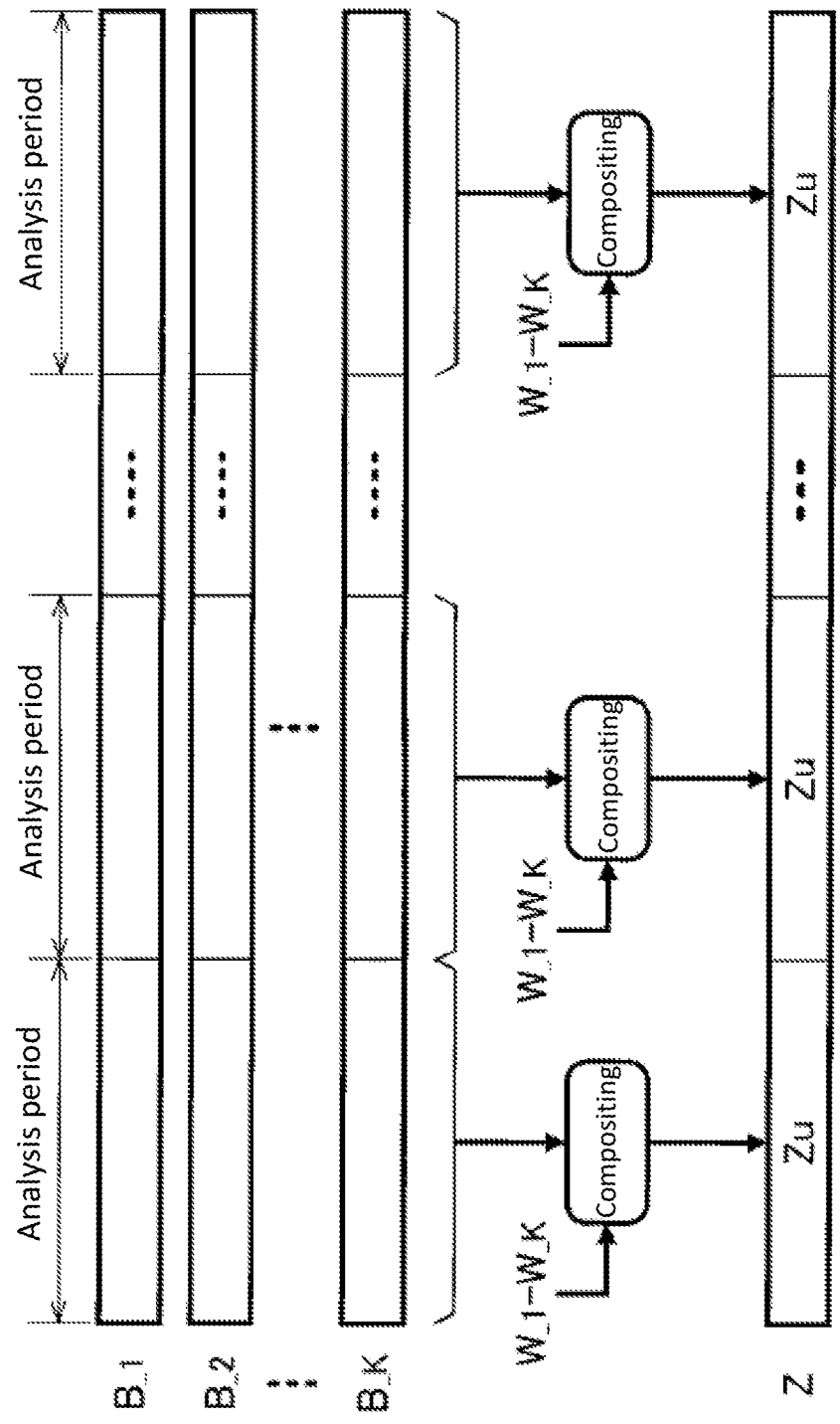
FIG. 4 is a diagram showing operations of the information processing apparatus.

The information processing unit 23 shown in FIG. 3 generates time series data Z from the K sets of basic data B_1 to B_K stored in the storage device 12 according to the index values W_k specified for the respective candidate tendencies C_k. FIG. 4 is a diagram showing operations of the information processing unit 23. As shown in FIG. 4, each of the K sets of basic data B_1 to B_K is sectioned into analysis periods on the time axis. When K index values W_1 to W_K are specified with respect to a given analysis period, the information processing unit 23 generates unit data Zu by compositing portions of the K sets of basic data B_1 to B_K within the analysis period. That is, unit data Zu is generated for each analysis period. A time series of a plurality of sets of unit data Zu corresponding to respective analysis periods is the time series data Z. As can be understood from the above description, with respect to a given analysis period on the time axis, the information processing unit 23 generates unit data Zu, which is a portion of the time series data Z within the analysis period, from portions of the K sets of basic data B_1 to B_K within the analysis period according to the index values W_1 to W_K of the candidate tendencies C_1 to C_K specified with respect to the analysis period. Therefore, the performance tendency in the time series data Z can be switched for each analysis period.

The information processing unit 23 in the first embodiment generates unit data Zu of the time series data Z by compositing notes that correspond to each other in the K sets of basic data B_1 to B_K according to the index values W_k of the respective candidate tendencies C_k. Specifically, as expressed by the following mathematical formula (1), the information processing unit 23 specifies a characteristic value Fz of a single note in the unit data Zu by calculating a weighted average of characteristic values F_k (F_1 to F_K) of notes corresponding to each other in the K sets of basic data B_1 to B_K, using the index values W_k as weightings. The characteristic value F_k of each note is the sound length or the sound volume of the note, for example. As a result of computation expressed by the mathematical formula (1) being executed for each note within the analysis period, the characteristic value Fz is specified for each note of a plurality of notes included in the unit data Zu.

$$Fz = W\_1 \cdot F\_1 + W\_2 \cdot F\_2 + W\_K \cdot F\_K \quad (1)$$

As can be understood from the mathematical formula (1), the characteristic value F_k of a note specified by basic data B_k that has a larger index value W_k is dominantly reflected in the time series data Z. As described above, the closer the performance tendency of the user U is to the candidate tendency C_k, the larger the index value W_k is. Accordingly, basic data B_k of a candidate tendency C_k that is closer to the performance tendency of the user U is dominantly reflected in the time series data Z. That is, the information processing unit 23 generates time series data Z in which the performance tendency of the user U is reflected.

Figure 5:
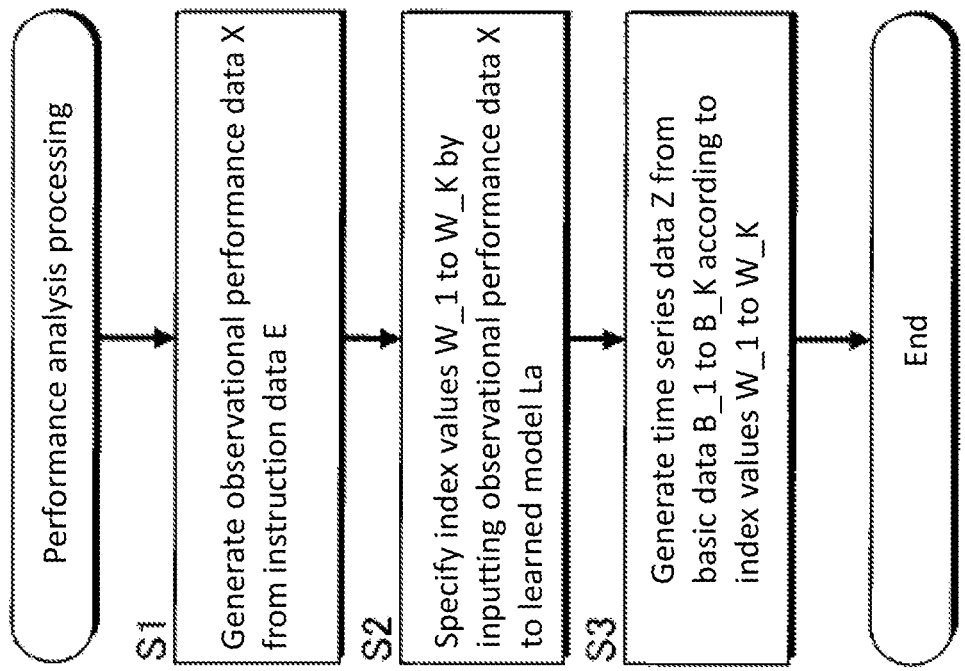
FIG. 5 is a flowchart showing an example of a procedure of performance analysis processing.

FIG. 5 is a flowchart showing an example of a procedure of processing (hereinafter referred to as "performance analysis processing") performed by the control device 11 in the first embodiment to generate the time series data Z. The performance analysis processing is started in response to an instruction being given from the user U to the information processing apparatus 100, for example, and is repeatedly performed for each analysis period.

When the performance analysis processing is started, the performance analyzing unit 21 generates observational performance data X from instruction data E sequentially supplied from the playing device 16 (step S1). The index specifying unit 22 specifies the index value W_k for each of the mutually different K candidate tendencies C_1 to C_K by inputting the observational performance data X to the learned model La (step S2). The information processing unit 23 generates unit data Zu corresponding to a processing target analysis period of the time series data Z from the K sets of basic data B_1 to B_K stored in the storage device 12 according to the index values W_k specified for the respective candidate tendencies C_k (step S3). As a result of the unit data Zu generated through this procedure being sequentially supplied to the sound source device 13, played sound of the second playing part in which the performance tendency of the user U is reflected is emitted from the sound emitting device 14.

As described above, according to the first embodiment, time series data Z is generated from the K sets of basic data B_1 to B_K corresponding to mutually different candidate tendencies C_k according to the index values W_k of the respective candidate tendencies C_k, and this is advantageous in that various kinds of time series data Z can be generated according to the performance tendency of the user U. Specifically, time series data Z that represents a time series of notes that are likely to be played by the user U under the performance tendency of the user U can be generated.

Second Embodiment

A second embodiment will be described. Note that in the following embodiments, elements having functions that are similar to those of the elements in the first embodiment are denoted using the same reference numerals as those used in the description of the first embodiment, and a detailed description of these elements is appropriately omitted. In the second embodiment, operations of the information processing unit 23 are changed from those in the first embodiment. Configurations and operations of the other elements of the information processing apparatus 100 are similar to those in the first embodiment.

Figure 6:
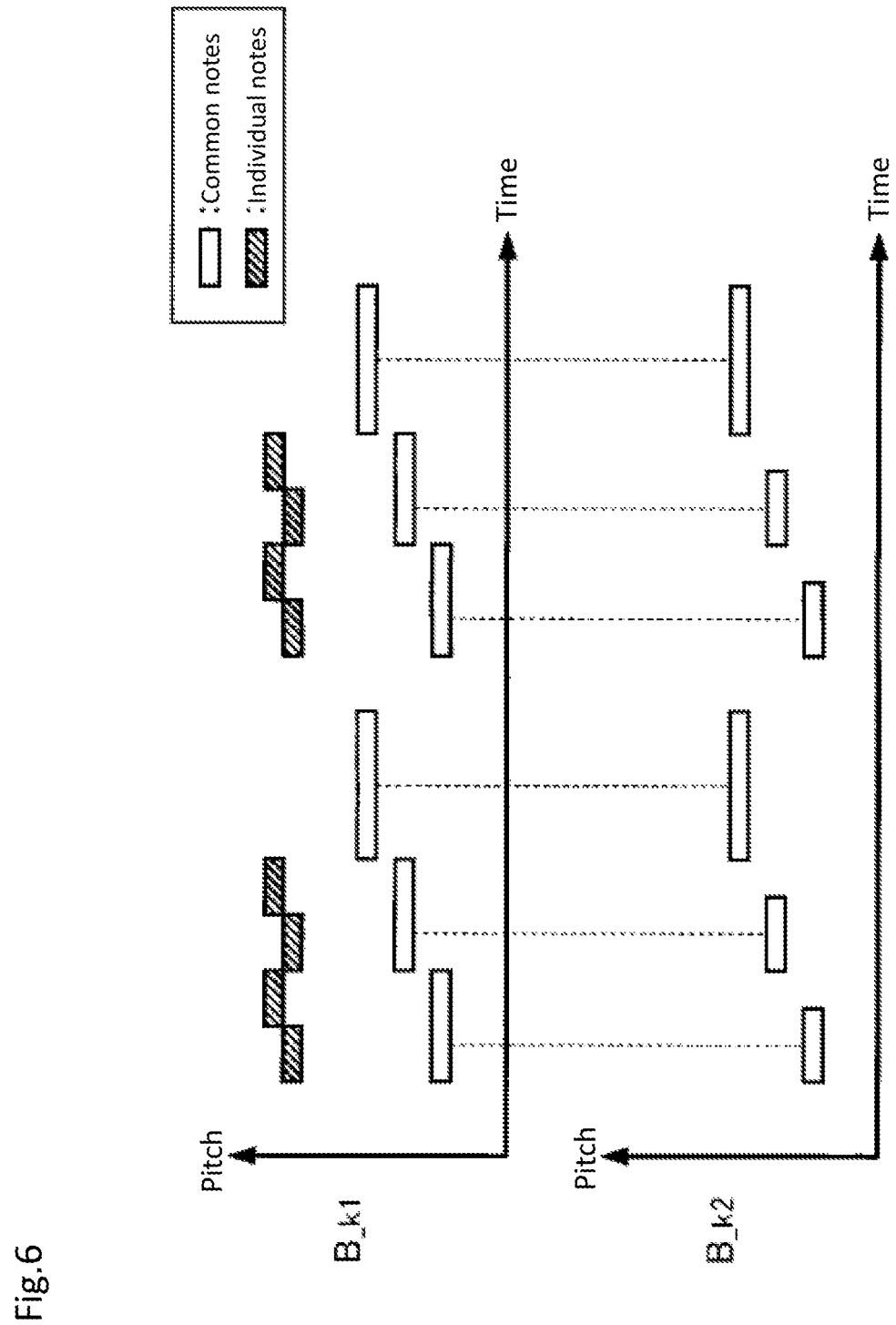
FIG. 6 is a diagram for explaining processing for compositing a plurality of sets of basic data in a second embodiment.

FIG. 6 is a diagram for explaining processing that is performed by the information processing apparatus 100 to composite K sets of basic data B_1 to B_K in the second embodiment. In FIG. 6, a time series of notes that are specified by basic data B_k1 and a time series of notes that are specified by basic data B_k2 are shown together.

As shown in FIG. 6, in the second embodiment, a plurality of notes specified by each set of basic data B_k are classified into notes (hereinafter referred to as "common notes") that correspond in the K sets of basic data B_1 to B_K and notes (hereinafter referred to as "individual notes") that differ for each set of basic data B_k. Common notes exit in common in the K sets of basic data B_1 to B_K. Specifically, the pitch of a common note is the same in the K sets of basic data B_1 to B_K and the position of the common note on the time axis is approximate or the same in the K sets of basic data B_1 to B_K. On the other hand, individual notes are unique to a set of basic data B_k and do not exist in other basic data B. That is, individual notes are notes for expressing features unique to individual candidate tendencies C_k.

Similarly to the first embodiment, the information processing unit 23 composites common notes of the K sets of basic data B_1 to B_K according to index values W_k of the respective candidate tendencies C_k. Specifically, the characteristic value Fz of each common note in time series data Z is specified by executing the computation expressed by the above-described mathematical formula (1) with respect to the characteristic value F_k of the common note. On the other hand, as for individual notes that are represented by basic data B_k of each candidate tendency C_k, the information processing unit 23 determines whether or not to select the individual notes as notes of the time series data Z according to the index value W_k of the candidate tendency C_k. Specifically, if the index value W_k is larger than a predetermined threshold value, the information processing unit 23 selects individual notes of the basic data B_k as notes of the time series data Z. On the other hand, if the index value W_k is smaller than the threshold value, the information processing unit 23 does not select the individual notes of the basic data B_k. That is, the individual notes are not included in the time series data Z. As can be understood from the above description, common notes in the K sets of basic data B_1 to B_K are composited, but individual notes and notes of other basic data B are not composited and whether or not to select the individual notes is determined depending on a result of comparison between the index value W_k and the threshold value.

Effects similar to those achieved in the first embodiment are also achieved in the second embodiment. Furthermore, in the second embodiment, individual notes of each set of basic data B_k are selected according to the index value W_k of the candidate tendency C_k. This is advantageous in that time series data Z in which content of each set of basic data B_k is appropriately reflected can be generated.

Third Embodiment

Figure 7:
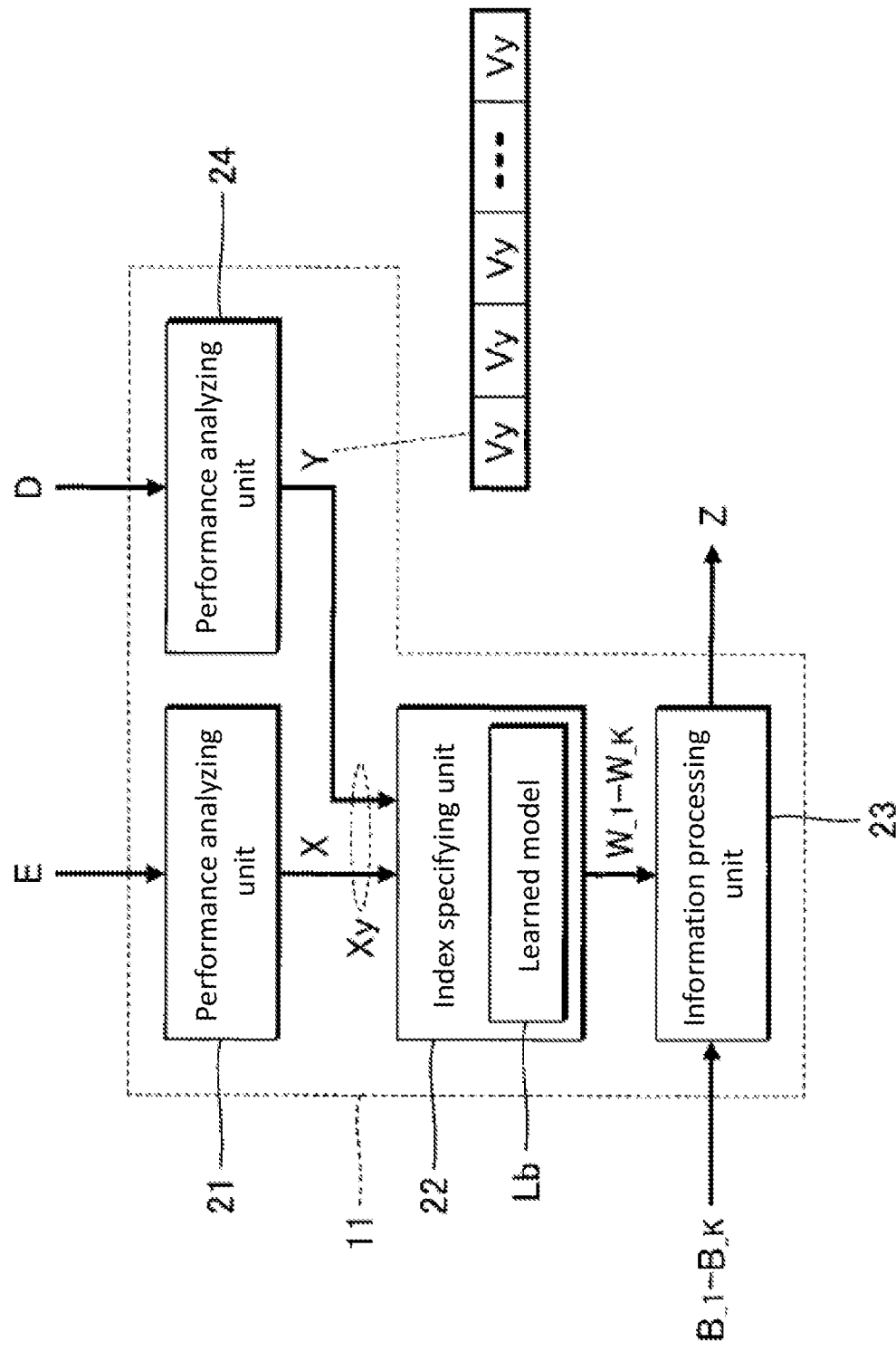
FIG. 7 is a block diagram showing an example of a functional configuration of an information processing apparatus according to a third embodiment.

A third embodiment will be described. FIG. 7 is a block diagram showing an example of a functional configuration of the information processing apparatus 100 in the third embodiment. The storage device 12 in the third embodiment stores musical piece data D that represents content of the first playing part of the played musical piece, in addition to the K sets of basic data B_1 to B_K. The musical piece data D specifies a times series of notes that constitute the first playing part. Specifically, the musical piece data D specifies the pitch, the sound volume, and the sound emission period for each of a plurality of notes constituting the first playing part. Similarly to each set of basic data B_k, an MIDI file is preferably used as the musical piece data. D.

As shown in FIG. 7 the control device 11 in the third embodiment functions as a performance analyzing unit 24, in addition to elements (the performance analyzing unit 21, the index specifying unit 22, and the information processing unit 23) that are similar to those in the first embodiment. The performance analyzing unit 24 sequentially generates reference performance data Y for each unit period from the musical piece data D stored in the storage device 12. The reference performance data Y represents a standard performance (e.g., a performance that is faithful to a musical score) of a musical piece. Specifically, the reference performance data Y is a vector that indicates the played sound volume of each pitch at a specific point in time (hereinafter referred to as a "playing point in time") of the played musical piece. The playing point in time is a point in time that progresses on the time axis at a speed according to a playing speed (tempo) of the played musical piece from a point in time at which the user U starts to play the played musical piece. Out of N elements Vy of the vector indicated by the reference performance data Y, an element Vy that corresponds to a pitch that is designated by the musical piece data D as a pitch to be played at the playing point in time is set to a numerical value that indicates a sound volume that is specified by the musical piece data D, and elements Vy that correspond to pitches that are not designated as the pitch to be played at the playing point in time are set to a numerical value (e.g., 0) that means that the pitches are not to be played.

Note that a point in time (a playing position) that is estimated as a position of the played musical piece that is being played by the user U may also be used as the playing point in time in generation of the reference performance data Y. Known acoustic analysis technology (score alignment) disclosed in JP 2015-79183A, etc., for example, can be employed as desired to estimate the position played by the user U.

As shown in FIG. 7, performance data Xy that includes observational performance data X generated by the performance analyzing unit 21 and the reference performance data. Y generated by the performance analyzing unit 24 is supplied to the index specifying unit 22 for each unit period. The index specifying unit 22 specifies K index values W_1 to W_K by inputting the performance data Xy to a learned model Lb. The learned model Lb in the third embodiment is a statistical prediction model obtained by learning a relationship between performance data Xy and K index values W_1 to W_K, and outputs K index values W_1 to W_K in response to input of performance data Xy. Similarly to the learned model La in the first embodiment, the learned model Lb in the second embodiment is constituted by a plurality of long short term memory units that are connected to each other in series.

A plurality of coefficients ω that define the learned model Lb are set through machine learning (in particular, deep learning) that is performed using a large number of sets of training data, and are stored in the storage device 12. Each set of training data is data in which performance data Xy of a unit period is associated with K index values W_1 to W_K (i.e., a pair composed of the performance data Xy of a unit period and the K index values W_1 to W_K). The plurality of coefficients ω of the learned model Lb are set in the machine learning so as to minimize a loss function that represents a difference between K index values W_1 to W_K that are generated when performance data Xy that serves as training data is input to a provisional model and K index values W_1 to W_K of the training data. Therefore, the learned model Lb outputs K index values W_1 to W_K that are statistically appropriate for unknown performance data Xy under a tendency that is extracted from the large number of sets of training data used for the machine learning. Note that if a relationship (e.g., a difference) between the observational performance data X and the reference performance data Y is important for specifying the K index values W_1 to W_K, the plurality of coefficients ω are set in the machine learning such that the relationship between the observational performance data X and the reference performance data Y is reflected in the coefficients. The specific procedure of processing that is performed by the information processing unit 23 to generate time series data Z using the K index values W_1 to W_K specified by the index specifying unit 22 is similar to that in the first embodiment.

Effects similar to those achieved in the first embodiment are also achieved in the third embodiment. Furthermore, in the third embodiment, the observational performance data X and the reference performance data Y are input to the learned model Lb, and this is advantageous in that index values W_k of the respective candidate tendencies C_k can be specified with consideration given to a difference between the observational performance data X and the reference performance data. Y, for example. Note that the configuration of the second embodiment in which different types of processing are performed for common notes and individual notes may also be applied to the third embodiment.

Fourth Embodiment

A fourth embodiment will be described. In the fourth embodiment, the form of the observational performance data X is changed from that in the first embodiment. Configurations and operations of the other elements of the information processing apparatus 100 are similar to those in the first embodiment.

Figure 8:
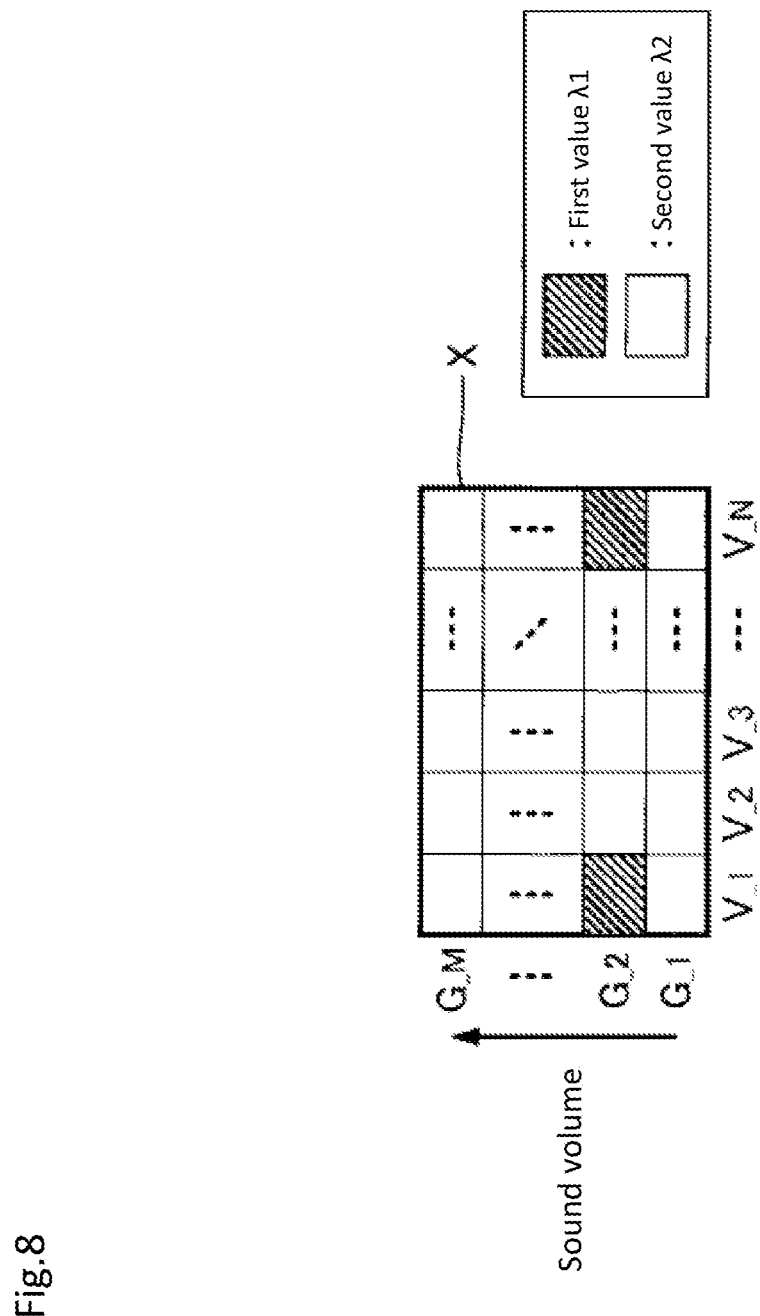
FIG. 8 is a diagram showing observational performance data in a fourth embodiment.

In the first embodiment, an N-dimensional vector in which elements Vx that represent played sound volumes of respective pitches are arranged with respect to N pitches is described as an example of the observational performance data X. As shown in FIG. 8, observational performance data X in the fourth embodiment includes N sound volume data pieces $V\_1$ to VN that correspond to mutually different pitches. Each piece of sound volume data $V\_n$ (n=1 to N) is an M-dimensional vector in which M elements $G\_1$ to GM that correspond to mutually different sound volumes are arranged. That is, the observational performance data X in the fourth embodiment represents a matrix that is constituted by M rows and N columns.

Out of the M elements $G\_1$ to $G\_M$ in the sound volume data $V\_n$ of each pitch, one element $G\_m$ (m=1 to M) that corresponds to the sound volume of the pitch played by the user U is set to a numerical value and the remaining (M−1) elements G are set to a numerical value $\lambda 2$ that differs from the numerical value $\lambda 1$. The numerical value XI (an example of a first value) is 1, for example, and the numerical value $\lambda 2$ (an example of a second value) is 0, for example. Note that if a chord constituted by a plurality of notes is played by the user U, one element $G\_m$ of the M elements $G\_1$ to $G\_M$ corresponding to the played sound volume is set to the numerical value XI with respect to sound volume data pieces V that respectively correspond to two or more pitches corresponding to the chord.

The index specifying unit 22 specifies K index values $W\_1$ to $W\_K$ corresponding to mutually different candidate tendencies $C\_k$ by inputting the observational performance data X having the above-described form to the learned model La. Observational performance data X that is used as training data in machine learning of the learned model La is data that includes the N sound volume data pieces $V\_1$ to $V\_N$ shown in FIG. 8. The specific procedure of processing that is performed by the information processing unit 23 to generate time series data Z using the K index values $W\_1$ to $W\_K$ specified by the index specifying unit 22 is similar to that in the first embodiment.

Effects similar to those achieved in the first embodiment are also achieved in the fourth embodiment. Note that in a configuration in which the observational performance data X of the first embodiment, which includes elements Vx indicating sound volumes of respective pitches, is input to the learned model La, the sound volume of each note played by the user U may not be sufficiently reflected in the K index values $W\_1$ to $W\_K$. This tendency is particularly noticeable in a configuration in which long short term memory units are used as the learned model La. In the fourth embodiment, the observational performance data X in which sound volume data pieces $V\_n$ that represent the sound volume in a binary manner using a series of M elements $G\_1$ to $G\_M$ are arranged with respect to N pitches is input to the learned model La. This is advantageous in that even if long short term memory units are used as the learned model La, for example, index values $W\_k$ in which the sound volume of each note played by the user U is appropriately reflected can be specified. That is, the played sound volume is effectively detected as the performance tendency of the user U.

Note that the configuration of the second embodiment in which different types of processing are performed for common notes and individual notes may also be applied to the fourth embodiment. Also, the configuration of the third embodiment in which K index values $W\_1$ to $W\_K$ are specified by inputting the observational performance data X and the reference performance data Y to the learned model Lb may also be applied to the fourth embodiment. If the configuration of the third embodiment is applied to the fourth embodiment, data in which sound volume data pieces $V\_n$ that represent the sound volume in a binary manner using M elements $G\_1$ to $G\_M$ are arranged with respect to N pitches is used for the reference performance data Y as well, similarly to the observational performance data X.

Variations

The following describes examples of aspects of specific variations to be added to the above-described embodiments. Two or more aspects that are freely selected from the following examples can also be appropriately combined so long as no contradiction is incurred.

(1) In the above-described embodiments, the performance analyzing unit 21 generates observational performance data X from instruction data E supplied from the playing device 16, but a configuration is also possible in which the performance analyzing unit 21 generates observational performance data X from an acoustic signal that represents the waveform of played sound of the played musical piece, for example. For example, the performance analyzing unit 21 computes a frequency spectrum by executing frequency analysis, such as short-term Fourier transformation, with respect to the acoustic signal and generates observational performance data X in which an element Vx that corresponds to a peak of the frequency spectrum is set to the intensity at the peak. As can be understood from the above description, instruction data E is not essential in generation of the observational performance data X.

(2) In the above-described embodiments, time series data Z is generated by compositing K sets of basic data $B\_1$ to $B\_K$ according to respective index values $W\_k$, but a configuration is also possible in which any of the K sets of basic data. $B\_1$ to $B\_K$ is selected as time series data Z according to the index values $W\_k$. For example, the information processing unit 23 selects one set of basic data $B\_k$ that corresponds to the largest value of the K index values $W\_1$ to $W\_K$ as unit data Zu for each analysis period. As can be understood from the above description, generation of time series data Z includes not only compositing of the K sets of basic data $B\_1$ to $B\_K$ but also selection of any of the K sets of basic data $B\_1$ to $B\_K$.

(3) In the above-described embodiments, time series data Z generated by the control device 11 is supplied to the sound source device 13, but there is no limitation to the configuration in which the time series data Z is supplied to the sound source device 13. The time series data Z generated by the control device 11 may also be supplied to a musical instrument (e.g., electronic musical instrument) that can emit sound specified by the time series data Z, for example. A configuration in which the time series data Z is supplied to a musical instrument can also be said to be a configuration in which the musical instrument is used as the sound source device 13 and the sound emitting device 14 in the above-described embodiments. Preferable examples of musical instruments to which the time series data. Z is supplied include automatic playing instruments (e.g., an automatic playing piano) that automatically play the played musical piece by driving a sound emission source (e.g., strings) according to the time series data Z, for example.

(4) The information processing apparatus 100 may also be realized by a computer, such as a server device, that communicates with a terminal device (e.g., a mobile phone or a smartphone) via a communication network, such as the Internet, for example. Specifically, the information processing apparatus 100 generates time series data Z by performing the performance analysis processing (FIG. 5) with respect to instruction data E received from the terminal device, and transmits the time series data Z to the terminal device. Note that the observational performance data X generated by the performance analyzing unit 21 or the reference performance data Y generated by the performance analyzing unit 24 may also be generated by the terminal device. That is, the performance analyzing unit 21 and the performance analyzing unit 24 may also be omitted from the information processing apparatus 100.

(5) In the above-described embodiments, time series data Z that represents a time series of notes is generated, but information specified by the time series data Z is not limited to the time series of notes. For example, a configuration is also possible in which time series data Z that causes an object (e.g., a virtual player) that is displayed in a display device to move according to the performance tendency of the user U is generated from K sets of basic data B_1 to B_K that indicate motions of the object. Alternatively, a configuration is also possible in which time series data Z that causes a lighting device to operate according to the performance tendency of the user U is generated from K sets of basic data B_1 to B_K for controlling light emission (e.g., blinking, the quantity of light, or the color of light) from the lighting device, for example. As can be understood from the above description time series data Z is comprehensively expressed as data that represents a time series of information regarding a played musical piece.

(6) A computer (e.g., the control device 11) and a program realize the functions of the information processing apparatus 100 according to the above-described embodiments in cooperation with each other. A program according to a preferable aspect of the present disclosure causes a computer to execute index specifying processing (step S2) for specifying, with respect to each candidate tendency C_k of mutually different K kinds of candidate tendencies C_1 to C_K, an index value W_k that indicates a probability that a performance of a played musical piece given by a user U corresponds to the candidate tendency C_k by giving observational performance data X representing the performance of the user U to a learned model La, and information processing (step S3) for generating time series data Z that represents a time series of information regarding the played musical piece from K sets of basic data B_1 to B_K according to index values W_k specified for the respective candidate tendencies C_k, the K sets of basic data. B_1 to B_K respectively representing time series of information corresponding to the K kinds of candidate tendencies C_1 to C_K.

The above-described program is provided in a state of being stored in a computer-readable recording medium and is installed into the computer. The recording medium is, for example, a non-transitory recording medium, and a preferable example of the recording medium is an optical recording medium (optical disk), such as a CD-ROM, but the recording medium includes any known recording medium, such as a semiconductor recording medium or a magnetic recording medium. Note that the non-transitory recording medium includes any recording medium except for transitory propagating signals, and does not exclude volatile recording mediums. Also, the program may also be provided to the computer as a result of being distributed via a communication network.

(7) A subject that executes artificial intelligence software for realizing the learned model (La, Lb) is not limited to the CPU. The artificial intelligence software may also be executed by a processing circuit, such as a Tensor Processing Unit, a Neural Engine, etc., that is dedicated for a neural network, or a DSP (Digital Signal Processor) that is dedicated for artificial intelligence, for example. Alternatively, a plurality of kinds of processing circuits selected from the above-described examples may also execute the artificial intelligence software in cooperation with each other.

Supplementary Notes

The following configurations are understood based on the above-described embodiments, for example.

An information processing method according to a preferable aspect (first aspect) of the present disclosure includes specifying, with respect to each of a plurality of mutually different performance tendencies, an index value that indicates a probability that a performance of a musical piece by a user corresponds to the performance tendency, by inputting observational performance data representing the performance of the musical piece by the user to a learned model, and generating time series data that represents a time series of information regarding the musical piece from a plurality of sets of basic data according to the index values specified for the respective performance tendencies, the plurality of sets of basic data respectively representing time series of information corresponding to the plurality of performance tendencies. According to this aspect, the time series data is generated from the plurality of sets of basic data corresponding to the mutually different performance tendencies according to the index values of the respective performance tendencies, and therefore various kinds of time series data can be generated according to the performance tendency of the user.

In a preferable example (second aspect) of the first aspect, index values of the respective performance tendencies are specified with respect to each of a plurality of analysis periods on a time axis by using the observational performance data within the analysis period, and a portion of the time series data within the analysis period is generated from portions of the plurality of sets of basic data within the analysis period according to the index values of the respective performance tendencies specified with respect to the analysis period. According to this aspect, with respect to each of the plurality of analysis periods on the time axis, index values of the respective performance tendencies are specified and a portion of the time series data corresponding to the analysis period is generated. Therefore, the performance tendency in the time series data can be switched for each analysis period.

In a preferable example (third aspect) of the first aspect or the second aspect, the time series data is data that represents a time series of notes. According to this aspect, time series data that represents a time series of notes that are likely to be played by the user under the performance tendency of the user can be generated.

In a preferable example (fourth aspect) of the third aspect, in the generation of the time series data, the time series data is generated by compositing notes that correspond to each other in the plurality of sets of basic data according to the index values of the respective performance tendencies. According to this aspect, time series data having content in which the plurality of sets of basic data are reflected can be generated by compositing the notes corresponding to each other in the plurality of sets of basic data.

In a preferable example (fifth aspect) of the fourth aspect, time series of notes represented by the basic data of the respective performance tendencies include common notes that correspond to each other in the plurality of sets of basic data and individual notes that differ for each set of basic data, and in the generation of the time series data, the time series data is generated by compositing the common notes corresponding to each other in the plurality of sets of basic data according to the index values of the respective performance tendencies and selecting the individual notes represented by the basic data corresponding to each performance tendency according to the index value of the performance tendency. According to this aspect, time series data having content in which the plurality of sets of basic data are reflected can be generated by compositing the notes corresponding to each other in the plurality of sets of basic data. Furthermore, individual notes of each set of basic data are selected according to the index value of the performance tendency. That is, individual notes and other notes are not composited. This is advantageous in that time series data in which content of each set of basic data is appropriately reflected can be generated.

In a preferable example (sixth aspect) of any of the first to fifth aspects, an index value that indicates a probability that the performance of the musical piece by the user corresponds to a specific performance tendency is specified by giving reference performance data representing a performance of the musical piece and the observational performance data to the learned model, the reference performance data being generated from musical piece data that specifies a time series of notes that constitute the musical piece. According to this aspect, the observational performance data and the reference performance data are given to the learned model, and therefore, index values of the respective performance tendencies can be specified with consideration given to a relationship (e.g., a difference) between the observational performance data and the reference performance data, for example.

In a preferable example (seventh aspect) of any of the first to sixth aspects, with respect to each of a plurality of pitches, the observational performance data includes sound volume data that includes a plurality of elements corresponding to mutually different sound volumes and, out of the plurality of elements in the sound volume data of each pitch, an element that corresponds to a sound volume of the pitch played by the user is set to a first value, and remaining elements are set to a second value that differs from the first value. According to this aspect, even if long short term memory (LSTM) units are used as the learned model, for example, index values in which the sound volume of each note played by the user is appropriately reflected can be specified.

Preferable aspects of the present disclosure are also realized as an information processing apparatus that executes the information processing methods according to the above-described aspects, or a program that causes a computer to execute the information pressing methods according to the above-described aspects.

LIST OF REFERENCE NUMERALS

100 Information processing apparatus
11 Control device
12 Storage device
13 Sound source device
14 Sound emitting device
16 Playing device
21 Performance analyzing unit
22 Index specifying unit (specifying unit)
23 Information processing unit
24 Performance analyzing unit

The invention claimed is:

1. An information processing method comprising:
generating performance tendency information indicating a performance tendency of a performance of a musical piece by a user from observational performance data representing the performance input to a learned model; and
generating time series data of the musical piece according to the generated performance tendency information,
wherein the performance tendency information includes an index value indicating a probability of the performance corresponding to a performance tendency, from among a plurality of mutually different performance tendencies, and
wherein the generating of the time series data generates the time series data from a plurality of sets of basic data respectively corresponding to the plurality of mutually different performance tendencies, according to the respective index values of the plurality of mutually different performance tendencies.

2. The information processing method according to claim 1, wherein:
the generating of the performance tendency information generates the index values using the observational performance data for a plurality of analysis periods on a time axis, and
the generating of the time series data generates, for each of the plurality of analysis periods, portions of the plurality of sets of basic data within the respective analysis period, according to the respective index values of the performance tendency for the respective analysis period.

3. The information processing method according to claim 1, wherein the time series data represents a time series of notes.

4. The information processing method according to claim 3, wherein the generating of the time series data generates the time series data by compositing notes corresponding to each other in the plurality of sets of basic data, according to the respective index values of the plurality of mutually different performance tendencies.

5. The information processing method according to claim 4, wherein:
the basic data of each of the plurality of mutually different performance tendencies represents time series of notes including common notes corresponding to each other in the plurality of sets of basic data and individual notes that differ for each set of basic data, and
the generating of the time series data generates the time series data by:
compositing the common notes corresponding to each other in the plurality of sets of basic data, according to the respective index values of the plurality of mutually different performance tendencies; and
selecting or not selecting the individual notes represented by the basic data corresponding to each performance tendency, according to the index value of the respective performance tendency.

6. The information processing method according to claim 1, wherein the generating of the performance tendency information generates the performance tendency information by furnishing reference performance data representing the performance of the musical piece and the observational performance data to the learned model, the reference performance data being generated from musical piece data specifying a time series of notes constituting the musical piece.

7. The information processing method according to claim 1, wherein:
   the observational performance data includes sound volume data including a plurality of elements corresponding to mutually different sound volumes for each of a plurality of notes, and
   an element, from among the plurality of elements in the sound volume data of each note, corresponding to a sound volume of the note played by the user is set to a first value, while remaining elements are set to a second value that differs from the first value.

8. An information processing method comprising:
   generating performance tendency information indicating a performance tendency of a performance of a musical piece by a user from observational performance data representing the performance input to a learned model; and
   generating time series data of the musical piece according to the generated performance tendency information,
   wherein the generating of the performance tendency information generates the performance tendency information for each of a plurality of analysis periods on a time axis, using the observational performance data within the respective analysis period, and
   wherein the generating of the time series data generates, for each of the plurality of analysis periods, a portion of the time series data within the respective analysis period, according to the performance tendency information for the respective analysis period.

9. The information processing method according to claim 8, wherein the time series data represents a time series of notes.

10. An information processing apparatus comprising:
    a memory storing instructions; and
    a processor that implements the instructions to execute a plurality of tasks, including:
       a first generating task that generates performance tendency information indicating a performance tendency of a performance of a musical piece by a user from observational performance data representing the performance input to a learned model; and
       a second generating task that generates time series data of the musical piece according to the generated performance tendency information,
    wherein the first generating task generates the performance tendency information for each of a plurality of analysis periods on a time axis using the observational performance data within the respective analysis period, and
    wherein the second generating task generates, for each of the plurality of analysis periods, a portion of the time series data within the respective analysis period according to the performance tendency information for the respective analysis period.

11. The information processing apparatus according to claim 10, wherein the time series data represents a time series of notes.

12. An information processing apparatus comprising:
    a memory storing instructions; and
    a processor that implements the instructions to execute a plurality of tasks, including:
       a first generating task that generates performance tendency information indicating a performance tendency of a performance of a musical piece by a user from observational performance data representing the performance input to a learned model; and
       a second generating task that generates time series data of the musical piece according to the generated performance tendency information,
    wherein the performance tendency information includes an index value indicating a probability of the performance corresponding to a performance tendency, from among a plurality of mutually different performance tendencies, and
    wherein the second generating task generates the time series data from a plurality of sets of basic data respectively corresponding to the plurality of mutually different performance tendencies, according to the respective index values of the plurality of mutually different performance tendencies.

13. The information processing apparatus according to claim 12, wherein:
    the first generating task generates the index values using the observational performance data for a plurality of analysis periods on a time axis, and
    the second generating task generates, for each of the plurality of analysis periods, portions of the plurality of sets of basic data within the respective analysis period, according to the respective index values of the performance tendency for the respective analysis period.

14. The information processing apparatus according to claim 12, wherein the time series data represents a time series of notes.

15. The information processing apparatus according to claim 14, wherein the second generating task generates the time series data by compositing notes corresponding to each other in the plurality of sets of basic data, according to the respective index values of the plurality of mutually different performance tendencies.

16. The information processing apparatus according to claim 15, wherein:
    the basic data of each of the plurality of mutually different performance tendencies represents time series of notes including common notes corresponding to each other in the plurality of sets of basic data and individual notes that differ for each set of basic data, and
    the second generating task generates the time series data by:
    compositing the common notes corresponding to each other in the plurality of sets of basic data, according to the index values of the respective performance tendencies; and
    selecting or not selecting the individual notes represented by the basic data corresponding to each performance tendency, according to the index value of the respective performance tendency.

17. The information processing apparatus according to claim 12, wherein the first generating task generates the performance tendency information by furnishing reference performance data representing the performance of the musical piece and the observational performance data to the learned model, the reference performance data being generated from musical piece data that specifies a time series of notes constituting the musical piece.

18. The information processing apparatus according to claim 12, wherein:

the observational performance data includes sound volume data including a plurality of elements corresponding to mutually different sound volumes for each of a plurality of notes, and an element, from among the plurality of elements in the sound volume data of each note, corresponding to a sound volume of the note played by the user is set to a first value, while remaining elements are set to a second value that differs from the first value.

\* \* \* \* \*